United States Patent [19]
De-Grinis et al.

[11] Patent Number: 5,453,730
[45] Date of Patent: Sep. 26, 1995

[54] AUTO ANTI-THEFT SYSTEM

[76] Inventors: Reinhard H. De-Grinis, 239 Paseo De Gracia; Donald W. Watt, 244 Paseo De Gracia, both of Redondo Beach, Calif. 90277

[21] Appl. No.: 135,593

[22] Filed: Oct. 13, 1993

[51] Int. Cl.⁶ ................................................. B60R 25/10
[52] U.S. Cl. ........................ 340/426; 340/425.5; 307/10.3
[58] Field of Search ................................ 340/425.5, 426, 340/430; 307/10.3, 10.4, 10.6

[56] References Cited

U.S. PATENT DOCUMENTS

| | | | |
|---|---|---|---|
| 4,435,649 | 3/1984 | Vandrigriff | 307/10.3 |
| 5,304,979 | 4/1994 | Lima et al. | 340/426 X |
| 5,307,048 | 4/1994 | Sonders | 340/426 |

*Primary Examiner*—Jeffery A. Hofsass
*Attorney, Agent, or Firm*—Roger A. Marrs

[57] ABSTRACT

Apparatus is disclosed herein for installation on an automotive vehicle which includes a receiver operably responsive to a remotely transmitted signal for incapacitating the vehicle power plant and for actuating warning lights indicative of vehicle unauthorized usage. The system includes a control unit response to operation of the receiver to interrupt fuel provided to the fuel pump via a centrifugal switch. Brake and hazard lights are energized to indicate a warning and hazard condition while the required triggering of an SCR or a power mosfet semiconductors coupled to the starter isolates the starter from the auto ignition system. A reset circuit is included for returning to normal auto operational systems and a delay circuit coupled to the control unit delays energizing the system for a predetermined period of time.

11 Claims, 3 Drawing Sheets

AUTO ANTI-THEFT SYSTEM

BACKGROUND OF THE INVENTION

1. Field of the Invention

The present invention relates to the field of auto anti-theft devices and systems, and more particularly to a novel system which disables the motive power of a vehicle in response to reception of a transmitted signal from a remote location.

2. Brief Description of the Prior Art

In the past, it has been the conventional practice to disable an automobile power plant at the discretion of the user by incorporating an engine "kill" switch somewhere along the dashboard of the vehicle so that when the operator of the vehicle leaves, the switch may be activated. Although such a disabling switch is useful for its intended purpose, its application is strictly in series with the ignition switch and may be readily bypassed by unauthorized persons who may jump the ignition and the "kill" switch in order to start the auto engine. Other problems and difficulties have been encountered with such conventional switches that stem largely from the fact that there is no delay between the activation and the attempt to steal the vehicle and there is no indication that unauthorized use of the vehicle is in progress. No means are provided in such conventional systems for isolating the starter from the ignition so that jumpering or bypassing of the ignition switch will still not permit the vehicle engine to be started.

Therefore, a long-standing need has existed to provide an auto anti-theft apparatus and system which will permit the user to remotely disable the auto power plant upon the transmission of an activating signal and wherein the system would include hazard and warning visual indicators, as well as providing for starter isolation from the ignition system. In some instances, the starter isolation means can be employed solely without use of the engine disabling means or the indication means.

SUMMARY OF THE INVENTION

Accordingly, the above problems and difficulties are avoided by the present invention which provides a novel anti-theft system for automobiles and other vehicles which includes a receiver carried on the vehicle which is responsive to a remotely located transmitter initiated signal that operates a control means for disabling the operation of the vehicle power plant and simultaneously provides visual indication that the vehicle is being operated in an unauthorized condition. Isolation means are also provided in the ignition system including the vehicle starter, which isolates the starter from the battery supply so that attempts to bypass the ignition system will prevent energizing the power plant. The engine disabling means further includes a centrifugal switch situated between the control means and the auto fuel pump for effectively disrupting the fuel supply to the engine in response to the transmitted signal as received by the receiver.

Therefore, it is among the primary objects of the present invention to provide a novel anti-theft system for vehicles which will disable the power plant while running and which will isolate the starter from its power source so as to completely render the vehicle inoperable by unauthorized personnel.

Yet another object of the present invention is to provide a novel electronic system that may be actuated remotely by authorized personnel so as to disable the vehicle at the selection of the authorized personnel to prevent theft and unauthorized use of the vehicle.

Still a further object of the present invention is to provide a simple and reliable means for preventing the hijacking of automobiles by unauthorized personnel and which is simple to install as well as to operate by unskilled persons.

Another object resides in providing an engine automatic shut-down system operated remotely by a transmitter and which includes a delay means permitting continued operation after activation for only a short limited time before engine shut-down.

Another object of the invention resides in employing a warning or alert means for indicating system operation and particularly during a predetermined time delay before engine disablement.

Another object resides in providing a system that automatically disables the engine start circuit if the battery power supply to the automobile has been disconnected and then reconnected by unauthorized personnel.

Still another objective of the invention resides in employing a system of triggering the isolation gates utilized in the engine shut down system that require a higher voltage to trigger the isolation gates than is readily available in the automotive electrical system.

Another objective of this invention resides in providing an engine starting system that does not require the use of a starter solenoid to run the starter.

BRIEF DESCRIPTION OF THE DRAWINGS

The features of the present invention which are believed to be novel are set forth with particularity in the appended claims. The present invention, both as to its organization and manner of operation, together with further objects and advantages thereof, may best be understood with reference to the following description, taken in connection with the accompanying drawings in which:

DESCRIPTION OF THE PREFERRED EMBODIMENT

Figure 1:
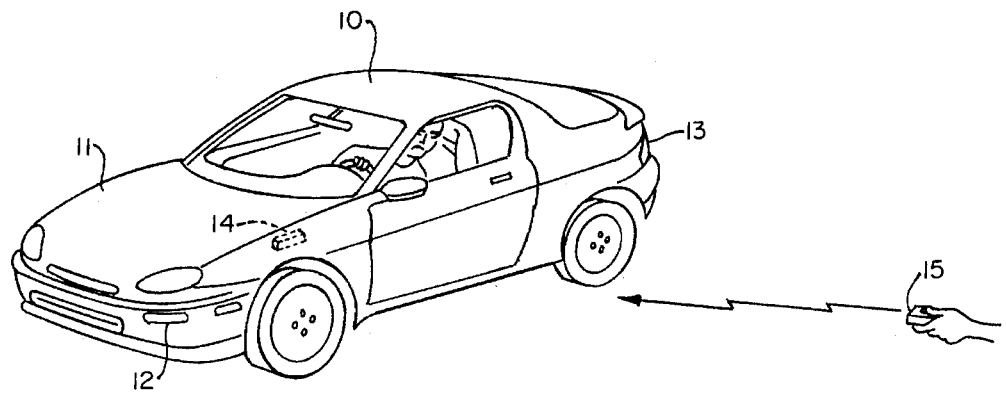
FIG. 1 is a diagrammatic view of an automobile being driven by unauthorized personnel preparatory for disabling of the auto power plant.

Referring to FIG. 1, a conventional automotive vehicle is indicated by numeral 10 which is powered by an engine located under the hood 11 of the vehicle. The vehicle also includes front and rear emergency or hazard lights, such as light 12, associated with the front of the vehicle, and tail lights, such as light 13, associated with the rear of the vehicle. Located within the engine compartment of the vehicle 10 is a receiver 14 having an internal antenna for receiving signals from a remote transmitter 15 held in the hand of an authorized user of the vehicle. The transmitter is a self-contained transmitter having a push-button control for energizing the transmitter so that the signal issues therefore in the direction of the arrow. Preferably, it is intended that the user depress the button on the transmitter as soon as practical after leaving the vehicle in accordance with instructions demanded by the unauthorized person stealing the vehicle. The transmitter 15 includes conventional circuits and represents the only part of the system located exteriorly of the vehicle.

Figure 2:
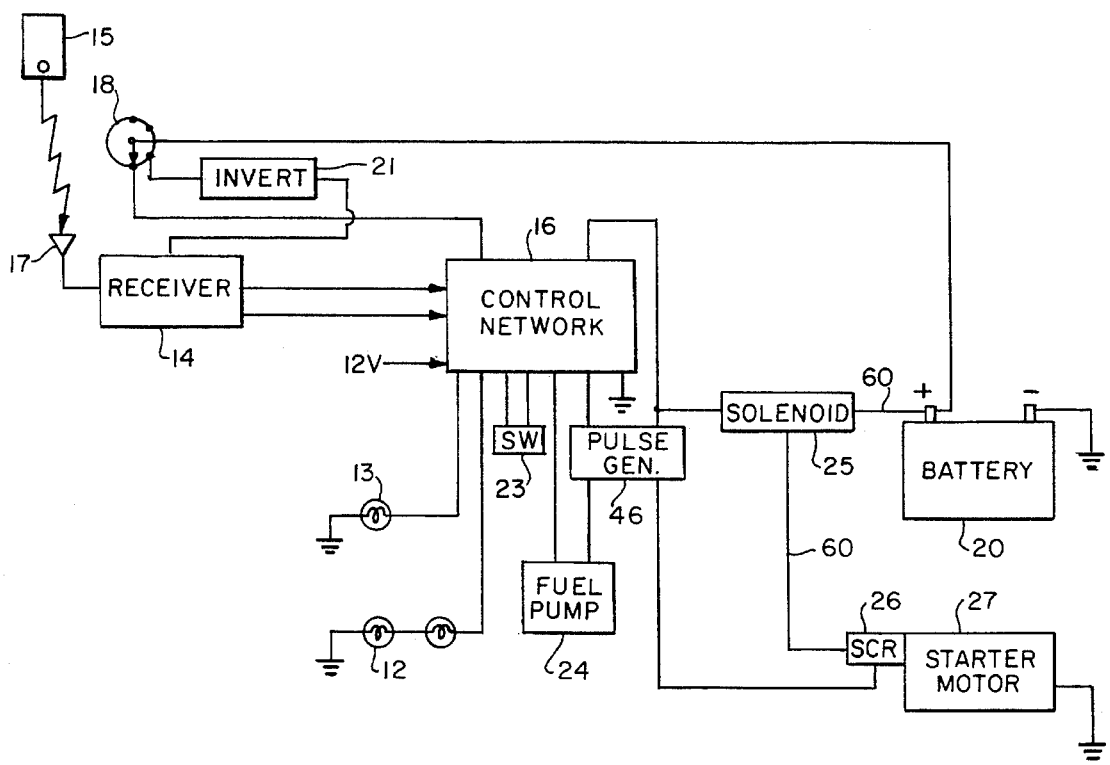
FIG. 2 is a block diagram of the novel auto anti-theft system incorporating the present invention.

Up to 400 feet away from the vehicle upon depression of the push-button on transmitter 15, a signal is provided with is received by receiver 14 and introduced to a control network, such as indicated by numeral 16 in FIG. 2. The result is to immediately activate a delay circuit and start engine disabling procedures which will occur in about 30 seconds. During the time delay, before expiration, such indicators as 13 are energized, which advise the authorized user that the system has been actuated. This is achieved by illuminating the brake lights 13 followed by illumination of the hazard lights 12 after delay. After the vehicle has been disabled and stopped, the hazard lights will indicate an emergency situation and oncoming drivers can avoid the disabled vehicle.

Referring now in detail to FIG. 2, it can be seen that the receiver 14 received a transmitted signal from the transmitter 15 via antenna 17 and the receiver applies control signals to the control network 16. A conventional ignition system is indicated by numeral 18 which is common to all motor vehicles as well as a battery 20 starter solenoid 25, and starter connected in the ignition system. An invertor 21 is necessary in order to step up the battery voltage to 110 volts for operation of the system. The control signals provided by the control network are applied to the tail lamp 13, a small LED indicator 54 and the hazard lights 12 as previously described. Additionally, control signals are applied to a centrifugal switch 23 which shuts off fuel to a fuel pump 24 so that the engine or power plant of the vehicle 10 is disabled. However, it is to be understood that the disabling of the engine occurs after a time delay of anywhere between 25 and 30 seconds and that the time delay circuit is included in the control unit 16.

The ignition circuit also is connected to a starter solenoid 25 which ordinarily is required for starting the engine. However, the present invention includes incorporating a gate isolation device, such as a silicon controlled rectifier or a power mosfet semiconductors 26 that is connected in series with the conventional starter 27. When not triggered by a control signal from the control means or network 16, the SCR or power mosfet 26 prevents power from turning the starter 27. Therefore, should an unauthorized person attempt to restart or to start the engine through the normal procedure of employing the ignition system, no engine start will occur. Furthermore, should unauthorized personnel attempt to "hotwire" or "jump" the ignition switch, the required triggering of the SCR or power mosfet 26 will prevent power from reaching the starter 27.

In order to deactivate the anti-theft system, the transmitter push button 15 is depressed. This initiates a signal to the control network 16 to rest the gate isolation SCR 26 or a power mosfet 26 and permitting operating to resume via the ignition switch 18.

Furthermore, a fail safe switch is included in the control network so that if a component in the system fails, the system would be bypassed so the normal operation employing the ignition switch 18 can be resumed.

Figure 3:
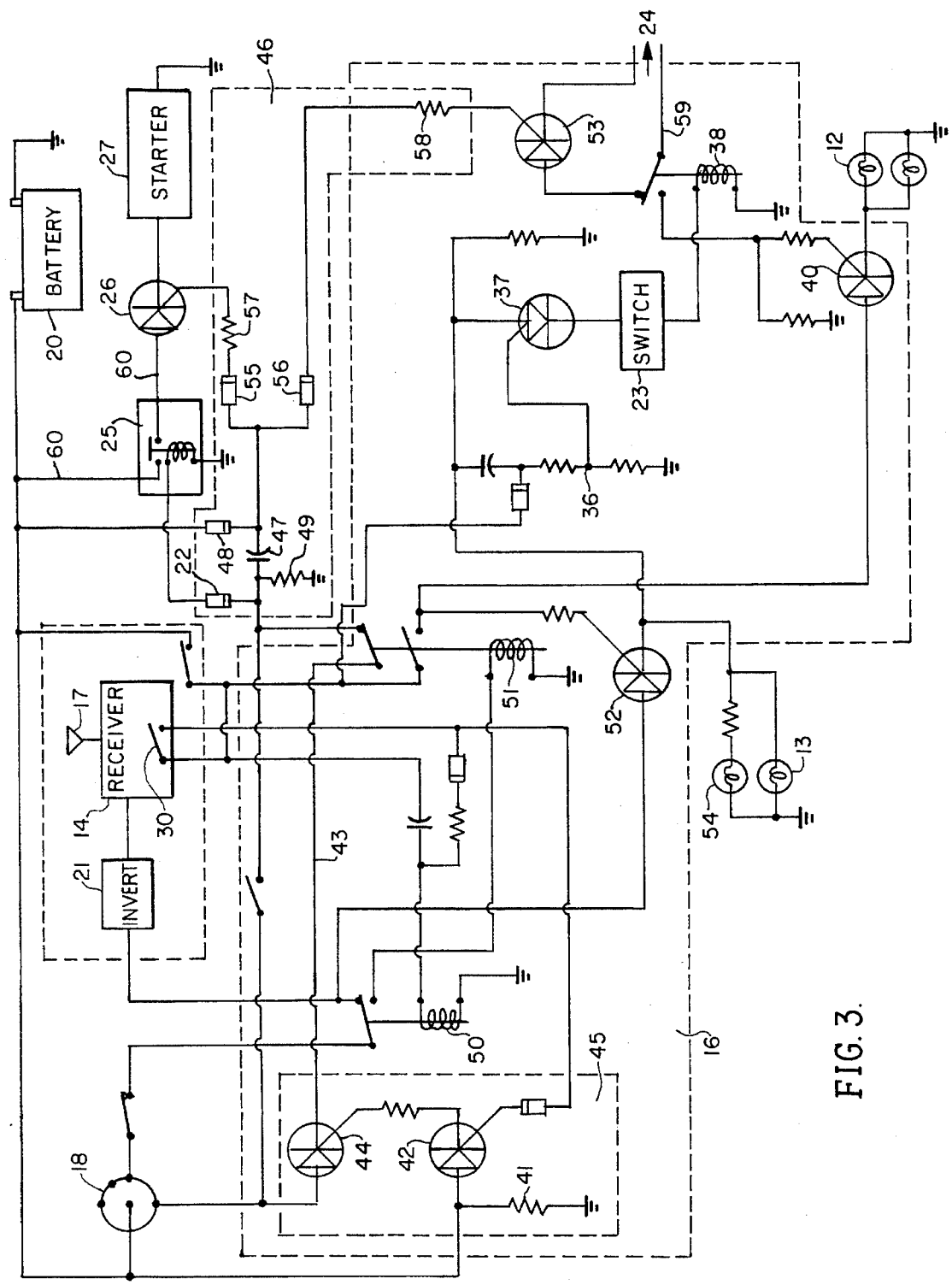
FIG. 3 is a circuit diagram of the system shown in FIG. 2.

Regarding FIG. 3, the engine with the ignition "ON" is running and when the transmitter 15 is pulsed, it momentarily closes switch 30 in receiver 14. This in turn pulses relay 50, which pulses latching relay 51. At this time, relay 51 triggers SCR 52 which turns "ON" the brake lights, activates the time-out or delay RC circuit 36, and removes the trigger voltage from SCR 53. RElay 51 also removes the start circuit and trigger circuit power to isolation gate SCR 26 or power mosfet 26 at the starter, thereby, shutting down the starter system. The starter system cannot be "hot wired" or "jump" started for reasons we have previously discussed. The engine is still running buy the starter system is disabled at this point.

It should be noted that when the system is activated, the first indication that the shut-down process has been initiated is that the brake lights will come "ON". At this point the shut down timing cycle has begun and the starter circuit has been disabled.

The element that is sensitive to the timing circuit is a programmable unijunction transistor (PUT). When the time circuit achieves a certain voltage condition, it triggers the PUT 37 and places power on the circuit to open relay 38. However, the power must go through centrifugal switch 23 before opening the power circuit to the fuel pump via relay 38. When power is applied to relay 38, which is in a normally closed position, it opens and removes electrical power to the pump. When this is done, the fuel pump stops and the car's engine stops. Since the trigger voltage has been removed from SCR 53 by relay 51 the circuit cannot be reactivated until SCR 53 is re-triggered. Relay 51 also applies power to SCR 40 which when triggered by the time-out system 36 turns "ON" the hazard lights 12.

The centrifugal switch 23 is controlled by the speed of the car, which can be taken from the drive shaft or any other moving part that is connected to the wheels directly. When a predetermined speed is reached, it will close and operates relay 38 shutting down the fuel pump. This results in a low speed shutdown for the car. The resetting of the system is accomplished by pulsing transmitter 15 which momentarily closes switch 30 in receiver 14 that in turn pulses relay 50 removing power from SCR 52 and sending a pulse to latching relay 51. Relay 51 then removes the trigger voltage from SCR 52. This completes the deactivation of time-out circuit 36. At the same time relay 51 re-establishes the starter power circuit, the trigger circuit, to the fuel pump SCR 53 and turns "OFF" the hazard lights 12.

One of a couple of features of this system is that you can remove the battery connection, depowering the whole system and reconnect it again without being able to restart the engine.

In many engine disabling devises the system can be reset to the normal operating condition by simply removing and reconnecting the battery. This possibility is avoided in this invention. SCR 42 receives continuous power directly from the battery. When receiver 14 is pulsed by transmitter push-button 15, switch 30 closes and triggers SCR 42 causing it to conduct. Holding resistor 41 then maintains the conductivity of SCR 42. The cathode output of SCR 42 triggers SCR 44. This trigger voltage is continuously applied to SCR 44 and is present than ignition 18 applies start voltage to SCR 44 allowing it to conduct and permit the start cycle to proceed. If the battery power is interrupted to SCR 42 it immediately ceases to conduct. This action removes the trigger voltage from SCR 44, thereby, preventing ignition 18 voltage from reaching the start circuit. To reset the start system, transmitter push-button 15 must again be pulsed.

It is possible to hot wire the isolation gate 26 to the starter and the isolation gate 53 to the fuel pump if the isolation gate semiconductors are energized with the minimum required triggered voltage when ignition 18 start voltage is applied. To avoid this possibility, resistors 57 and 58 were added in series with each of the trigger circuits to SCRs 26 and 53 to increase the minimum voltage required to trigger the. When 12 volts is used to trigger these circuits the voltage drop caused by resistors 57 and 58, reduces the applied 12 volts below the minimum voltage required to trigger SCRs 26 and 53. However, since the only power source readily available is the 12 volt battery, and a higher than 12 volt source is required to trigger SCRs 26 and 53 "ON", a pulse generation circuit 46 was devised to meet this requirements. In this system, power is applied continuously to circuit 46 which charges capacitor 47 through diode 48 and resistor 49 to full supply voltage. When ignition 18 applies power to circuit 46 through line 43, the low side of capacitor 47 is suddenly raised to +12 volts. This in turn, raises the diode side of capacitor 47 to +24 volts. Capacitor 47 then discharges at +24 volts to diodes 55 and 56, providing the necessary higher voltage through resistors 57 and 58 to trigger SCRs 26 and 53, thus turning them "ON". Ignition 18 then sends +12 volt power to the starter solenoid 25 which in turn sends battery power to SCR 26 which energizes the starter motor. At the same time ignition 18 also sends 12 volt power to SCR 53 which energizes the fuel pump, thereby, permitting the engine to start.

Another feature of this system is its use as an anti-theft system for every day parking. Prior to shutting "OFF" the ignition switch 18, depress transmitter push-button 15, then turn "OFF" the ignition switch 18. Transmitter push-button 15 momentarily closes switch 30 in receiver 14 which pulses relay 50 that in turn pulses latching relay 51. At this time, relay 51 triggers SCR 52 which turns "ON" the brake lights, activates the time-out circuit 36 and removes the trigger voltage from SCR 53. Relay 51 also opens the start circuit, and the trigger circuit power is isolation gate SCR 26 or power mosfet 26 at the starter, thereby, shutting down the starter system. The ignition switch 18 is now turned "OFF". This action aborts the time delay cycle and shuts down the engine immediately. The starter system is immobilized, the fuel pump circuit is immobilized and the brake lights are turned "OFF". Resetting the system for normal operation is described above.

Figure 4:
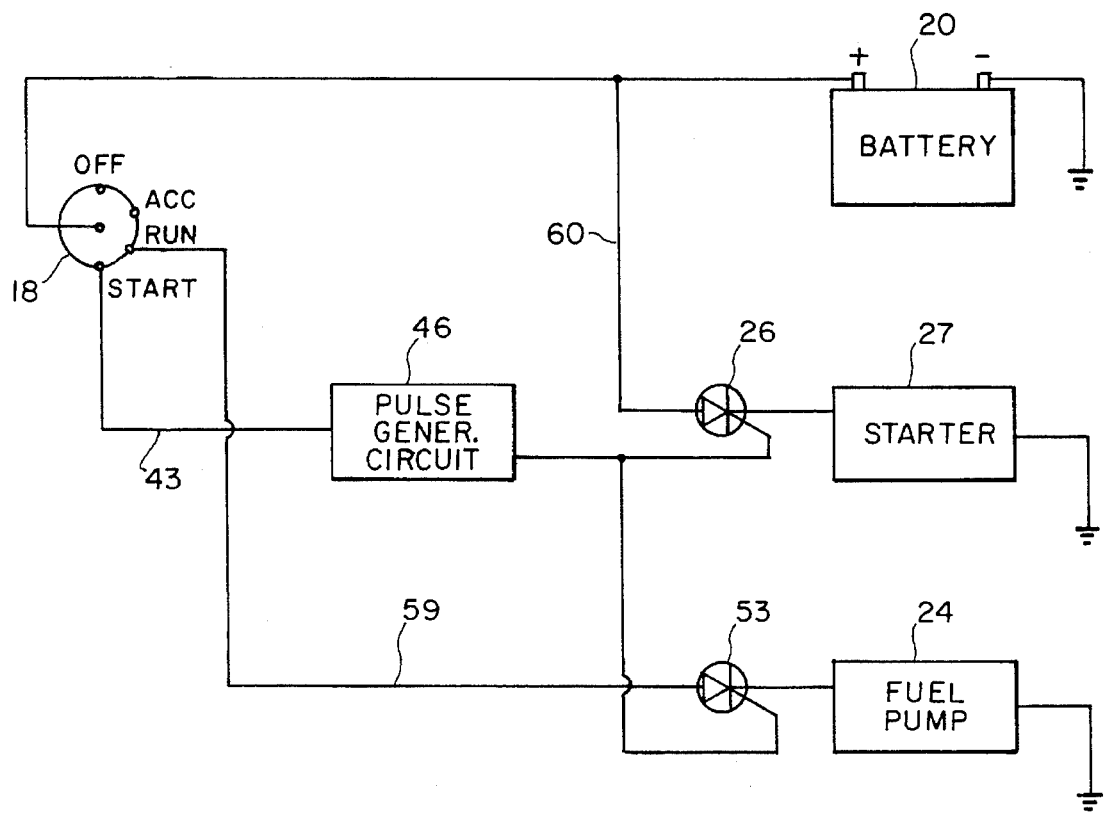
FIG. 4 is a circuit diagram of an alternate starter disabling means using a power mosfet in the present invention.

The starting system in the present invention has been modified so that the engine cannot be started without triggering a silicon controlled rectifier SCR 26 or a power mosfet 26 and SCR 53. Referring now to FIG. 4, an alternate configuration of this invention uses a power mosfet 26 to the exclusion of SCR 26. In this configuration the starter solenoid required in standard starter systems, is not required. The power mosfet 26 supplies battery power directly to the starter when ignition 18 voltage is applied to the power mosfet 26 trigger via line 43 and to SCR 53 trigger through circuit 46. When the ignition 18 voltage is removed from the power mosfet trigger 26, battery power to the starter 27 is automatically cut off. The power to SCR 53 is provided through line 59 to operate the fuel pump 24. Other qualities of these configurations are—neither SCR 26 or power mosfet 26 have any moving parts and no arcing can occur when they are turned "ON" or "OFF". Either of these devises can be built into the starter 27 itself or anywhere in the battery 20 to starter 27 power cable 60. Both SCR and 26 power mosfet reduce the weight of the standard starting system. This is of particular importance in the design of aircraft engine starting systems.

While particular embodiments of the present invention have been shown and described, it will be obvious to those skilled in the art that changes and modifications may be made without departing from this invention in its broader aspects and, therefore, the aim in the appended claims is to cover all such changes and modifications as fall within the true spirit and scope of this invention.

What is claimed is:

1. An auto anti-theft system comprising:

an ignition circuit for an engine;

a battery connected in series with said ignition circuit for providing starting power and running power;

an engine starter;

a starter solenoid operably coupled in series between said engine starter and said ignition circuit;

said starter solenoid having a coil operating opening and closure of starter solenoid contacts thereby said coil is energized by said ignition circuit;

a first isolation gate connected in series between said starter solenoid contacts and said engine starter for selectively conducting said starting power to said engine starter form said battery;

a pulse generation circuit operably coupled between said ignition circuit and said engine starter via said first isolation gate responsive to energizing of said ignition circuit to generate a trigger signal; and said first isolation gate connected to said pulse generation circuit and responsive to said trigger signal to conduct said starting power from said battery to said starter.

2. The invention as defined in claim 1 including:

a fuel pump;

a second isolation gate operably connected between said ignition circuit and said fuel pump; and said second isolation gate operably connected to said pulse generation circuit and responsive to said trigger signal to conduct said starting power and said running power to said fuel pump.

3. The invention as defined in claim 2 wherein:

said isolation gates are silicon controlled rectifiers responsive to said trigger signal of a predetermined voltage level.

4. The invention as defined in claim 3 wherein:

said first isolation gate is a high amperage SCR of at least 40 amps having a cathode connected to said engine starter and an anode connected to said starter solenoid for carrying total said starting power to said engine starter.

5. The invention as defined in claim 2 wherein:

said first and said second isolation gate is either an SCR or a power mosfet and each isolation gate has two states, one state of conduction and one state of non-conduction;

said first and said second isolation gates responsive to said trigger signal to simultaneously perform in said conduction state to apply power to both said engine starter and said fuel pump.

6. The invention as defined in claim 2 wherein:

said second isolation gate is a low amperage SCR of at least 2 amps having a cathode connected to said fuel pump and an anode connected to said ignition circuit for carrying said starting power and said running power at full fuel pump current and voltage from said battery.

7. The invention as defined in claim 5 wherein:

said first and said second isolation gates in said non-conduction states constitute an engine disabling means while in said conduction state constitute an engine enabling means whereby said first isolation gate automatically goes to said non-conductive state in response to de-energizing of said starter solenoid.

8. The invention as defined in claim 7 wherein:

each of said isolation gates having a trigger in addition to said cathode and said anode;

said pulse generator circuit is connected to a limit resistor connected to each said SCR trigger making said trigger responsive to said trigger signal allowing only a voltage within a range of 30 to 600 volts to said SCR triggers to cause the said first and second isolation gates to conduct and to power the said engine starter and said fuel pump.

9. The invention as defined in claim 2 including:

a receiver producing a control signal and coupled to said pulse generator circuit for generating said trigger signal in response to said control signal and to trigger the first and second isolation gates into conduction of starting power to said engine starter and said starting power and said running power to said fuel pump whereby a second actuation of the said control signal terminates the conduction of said running power to said fuel pump; and a remote transmitter manually operably to generate an activation signal to said receiver.

10. An auto anti-carjack and anti-theft system comprising:

an ignition circuit for an engine;

a pulse generation circuit producing a control signal operably coupled to said ignition circuit;

a battery connected with said ignition circuit for providing starting power and running power;

an engine starter operably coupled to said engine;

a starter solenoid having a relay coil and starter contacts;

said starter solenoid relay coil connected in series with said battery and said ignition circuit;

said battery connected in series with said starter solenoid starter contacts and said engine starter to provide said starting power;

a first isolation gate connected in series with said starter solenoid starter contacts and said engine starter for selectively conducting said starting power to said engine starter from said battery;

a first isolation gate trigger resistor;

a first isolation gate trigger connected in series with said first isolation gate trigger resistor;

said pulse generation circuit connected in series with said first isolation gate trigger resistor;

said ignition circuit for initiating said starter power to said starter solenoid relay coil simultaneously with said pulse generation circuit sending a voltage pulse to said first isolation gate trigger resistor for triggering said first isolation gate into a state of conduction permitting passage of said starting power from said battery through closed starter solenoid starter contacts via said first isolation gate to said engine starter; and said ignition circuit adapted to terminate said starting power to said starter solenoid relay coil as said starting power is cut off to said first isolation gate by said starter solenoid starter contacts opening and said first isolation gate reverts automatically to a non-conductive state; said first isolation gate being retriggered into a state of conduction before said starting power energizes said engine starter.

11. The invention as defined in claim 10 including:

a fuel pump;

a second isolation gate connected in series with said ignition circuit and said fuel pump;

a second isolation gate trigger resistor;

a second isolation gate trigger connected in series with said second isolation gate trigger resistor;

said pulse generation circuit connected in series with said second isolation gate trigger resistor; and said ignition circuit adapted to initiate said starting power and running power to said second isolation gate wherein said pulse generation circuit sends a voltage pulse to said second isolation gate trigger resistor triggering said second isolation gate into a state of conduction permitting passage of said starting power and said running power from said battery through said ignition circuit to said second isolation gate to said fuel pump.

* * * * *